(12) United States Patent
Becker-Weimann et al.

(10) Patent No.: US 7,997,314 B2
(45) Date of Patent: *Aug. 16, 2011

(54) METHOD AND DEVICE FOR PRODUCING VENEER AND VENEERED PARTS AND VENEER AND VENEERED PARTS

(75) Inventors: Klaus Becker-Weimann, Karlsruhe (DE); Oliver Büker, Marxzell-Burbach (DE)

(73) Assignee: Klebchemie M.G. Becker GmbH & Co. KG, Weingarten/Baden (DE)

( * ) Notice: Subject to any disclaimer, the term of this patent is extended or adjusted under 35 U.S.C. 154(b) by 1089 days.

This patent is subject to a terminal disclaimer.

(21) Appl. No.: 10/478,145

(22) PCT Filed: May 16, 2002

(86) PCT No.: PCT/DE02/01772
§ 371 (c)(1),
(2), (4) Date: Jul. 2, 2004

(87) PCT Pub. No.: WO02/094549
PCT Pub. Date: Nov. 28, 2002

(65) Prior Publication Data
US 2004/0250906 A1    Dec. 16, 2004

(30) Foreign Application Priority Data
May 18, 2001 (DE) .................. 101 24 688

(51) Int. Cl.
*B05D 3/00* (2006.01)
*B27D 1/04* (2006.01)

(52) U.S. Cl. ..... 144/332; 144/380; 427/377; 427/385.5; 427/397

(58) Field of Classification Search ............ 144/344, 144/346, 348, 352, 332, 380; 428/423.1; 427/377, 398.1, 384, 385.5, 394, 397
See application file for complete search history.

(56) References Cited

U.S. PATENT DOCUMENTS

| | | | | |
|---|---|---|---|---|
| 3,139,372 A | * | 6/1964 | Elliott | 428/141 |
| 3,537,946 A | | 11/1970 | Truax et al. | |
| 3,900,690 A | | 8/1975 | Schwarz | |
| 3,963,820 A | | 6/1976 | Blakey | |
| 4,169,005 A | * | 9/1979 | Fogle et al. | 156/272.2 |
| 4,204,051 A | * | 5/1980 | Wellner et al. | 528/55 |
| 4,418,106 A | | 11/1983 | Landler et al. | |

(Continued)

FOREIGN PATENT DOCUMENTS

CA    2187055 A1    4/1997

(Continued)

OTHER PUBLICATIONS

English language abstract only.

(Continued)

*Primary Examiner* — Shelley Self
(74) *Attorney, Agent, or Firm* — Baker & Daniels LLP

(57) ABSTRACT

The invention aims at improving a method and a device (17) for the production of veneers (1) and veneered parts (13) and to veneers (1) and veneered parts (13). To this end, a sealing layer (2) is applied on the surface of the veneer (1) before further processing. The device (17) includes a veneer producing device known per se, a finishing station (6), a transporting device (5) and a polishing station (8).

22 Claims, 2 Drawing Sheets

U.S. PATENT DOCUMENTS

| | | | |
|---|---|---|---|
| 4,865,912 A * | 9/1989 | Mitsumata | 442/378 |
| 5,350,617 A | 9/1994 | Fujisawa et al. | |
| 5,418,034 A * | 5/1995 | McGuire, III | 428/106 |
| 6,004,648 A * | 12/1999 | Snyder | 428/106 |
| 6,180,172 B1 | 1/2001 | Hasenkamp et al. | |
| 6,180,175 B1 | 1/2001 | Saika et al. | 427/387 |
| 6,258,918 B1 * | 7/2001 | Ho et al. | 528/66 |
| 6,271,305 B1 * | 8/2001 | Rajalingam et al. | 524/705 |
| 6,280,561 B1 | 8/2001 | McInnis et al. | |
| 6,432,237 B1 | 8/2002 | Hasenkamp et al. | 156/79 |
| 2002/0056938 A1 | 5/2002 | Hasenkamp et al. | |
| 2005/0255250 A1 | 11/2005 | Becker-Weimann et al. | |

FOREIGN PATENT DOCUMENTS

| | | |
|---|---|---|
| DE | 1 170 606 | 5/1964 |
| DE | 41 37 135 | 5/1993 |
| DE | 195 43 901 | 5/1996 |
| DE | 19543901 A1 | 5/1996 |
| DE | 19806136 A1 | 8/1998 |
| DE | 198 06 136 | 5/2000 |
| EP | 0197324 | 3/1986 |
| EP | 0 612 609 | 8/1994 |
| EP | 0 699 545 | 3/1996 |
| EP | 0699545 A2 | 3/1996 |
| EP | 0 744 260 | 11/1996 |
| EP | 0838269 | 4/1998 |
| EP | 0918600 | 1/2001 |
| GB | 2213406 A | 8/1989 |
| WO | WO 95/01869 | 1/1995 |
| WO | WO 98/04390 | 2/1998 |
| WO | WO02/094457 | 11/2002 |

OTHER PUBLICATIONS

Office Action dated Jan. 28, 2008, in related U.S. Appl. No. 10/478,143, filed May 10, 2005.
Office Action dated Jun. 16, 2008, in related U.S. Appl. No. 10/478,143, filed May 10, 2005.
Office Action dated Jan. 23, 2009, in related U.S. Appl. No. 10/478,143, filed May 10, 2005.
Office Action dated Jun. 24, 2009, in related U.S. Appl. No. 10/478,143, filed May 10, 2005.
Notice of Opposition in European Patent No. 1,401,650B1, dated Jul. 23, 2007.
Reply to Notice of Opposition in European Patent No. 1,401,650B1, dated Mar. 18, 2008.
Jun. 22, 2010, Office Action in co-pending U.S. Appl. No. 10/478,143.
Amendment dated Nov. 24, 2009, filed in co-pending U.S. Appl. No. 10/478,143.
Decision of the European Patent Office in the Opposition Proceedings Between Klebchemie M.G. Becker Gmbh & Co. KG and Henkel KGaA, known to May 18, 2001.
K. Weigel, "Polyurethane Lacke", 1996, pp. 28 and 29, known prior to May 18, 2001.
Foreign patent document with English language abstract, known prior to May 18, 2001.

\* cited by examiner

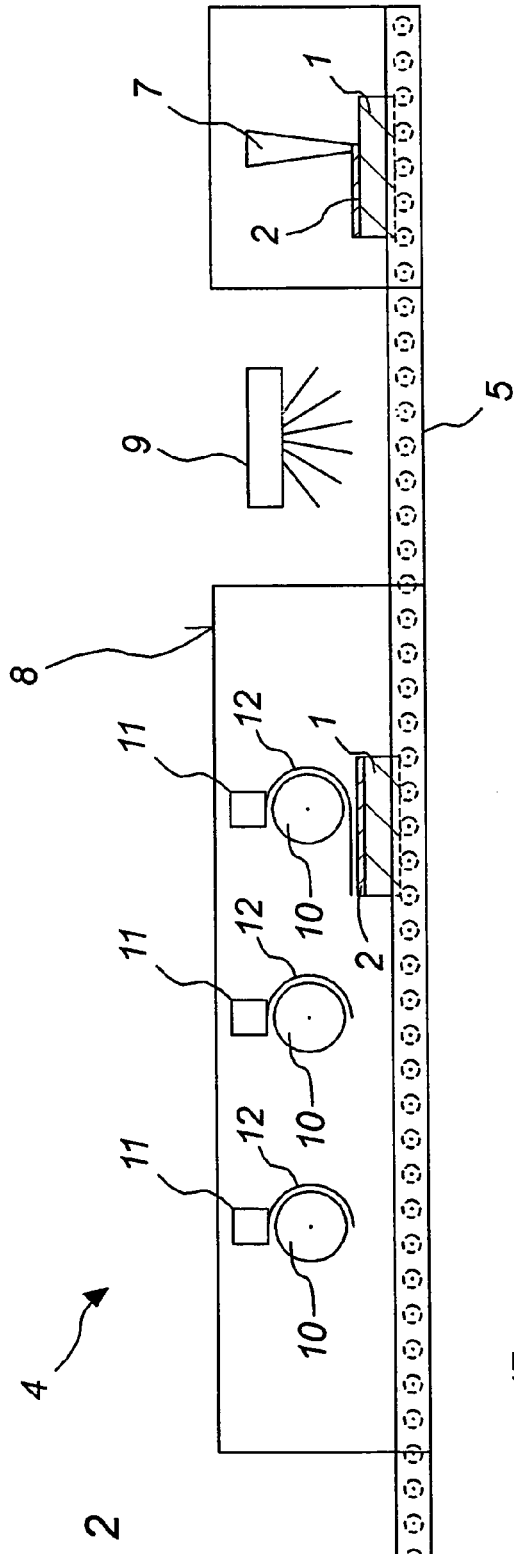
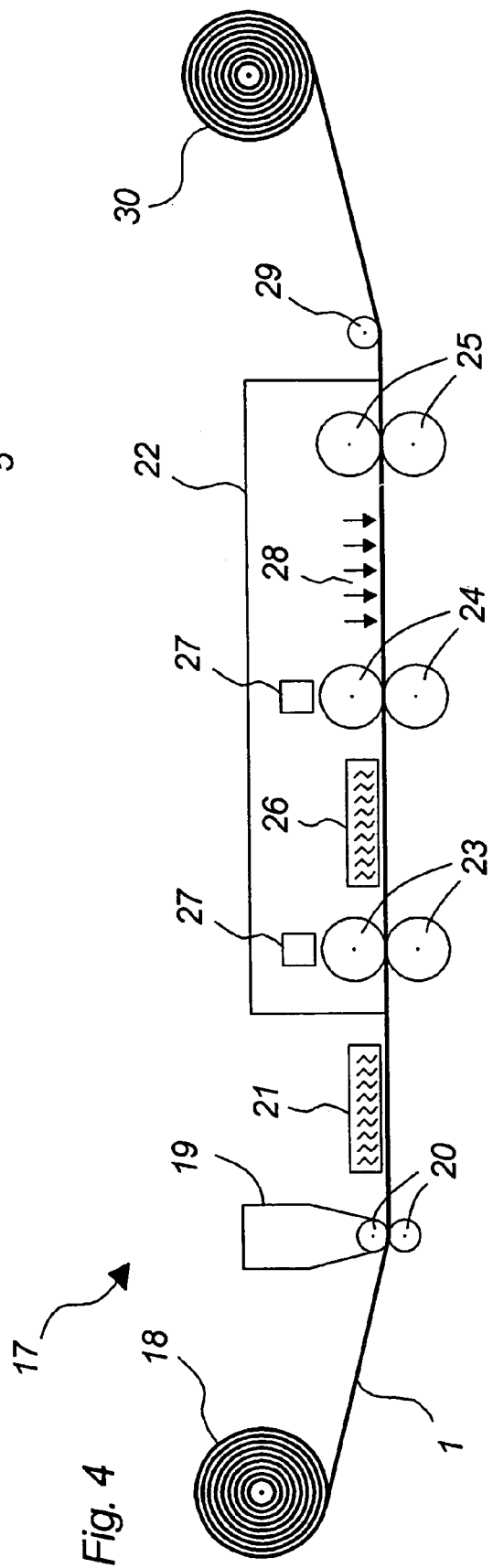

METHOD AND DEVICE FOR PRODUCING VENEER AND VENEERED PARTS AND VENEER AND VENEERED PARTS

BACKGROUND

The invention relates to a method and a device for producing veneer and veneered parts.

Veneer is used in large measure in the furniture and wood-processing industry. For example, veneer finds application in the field of wrapping, for example for wall connection strips, for surface lamination e.g. for furniture surfaces, for planks, tables etc. or in edge coating or edge gluing, for example for straight edges, soft-forming or post-forming with table boards, furniture doors or the like. For this purpose the veneer itself is first produced, for example by means of stripping from a solid piece of wood. These large area veneer sheets are then either placed in temporary storage, for example wound up into a veneer roll or are immediately further processed. In the finishing of the veneer for production of veneered parts the veneer is glued onto the wooden support or derived timber product support and then the half finished part is sanded and painted or else directly painted. The painting operation is costly, since not only surfaces, but also profile geometries of the veneer paneling profile have to be painted. The profiles can be bonded with the veneer in the soft-forming process on an edge banding machine, in the post-forming process or in another way. The paints used in painting must as a rule be applied in multiple coats, which calls for expensive process technology and corresponding floor space requirements.

One widespread painting system involves ultraviolet hardened paints, which are usually applied by roller coating, more rarely in spray application on the parts. The subsequent curing process occurs with ultraviolet light or ultraviolet lamps. The mechanical cost in painting with ultraviolet paints is very high and necessitates very large floor space requirements. The large floor space requirements are also due to the fact that the painting process with ultraviolet curing systems usually require several applications—in practice three to four applications are common. With each coat of paint, due to the viscosity and especially due to the ultraviolet curing only approximately 10 to 20 my layers can be applied, which is why several paint applications are necessary. Ultraviolet lamps and the necessary energy for curing are quite expensive.

Other painting systems, such as 2 package urethane coating paints, nitrocellulose lacquers or water-based paints must also be applied in several layers. Fillers, primers and if necessary intermediate sanding are also always necessary and make the surface coating complex and is mechanically very time-consuming and costly.

BRIEF SUMMARY

It is the objective of the invention to advantageously further develop the state of the art.

This task is solved with the features of the independent claims.

In a method for producing one or multiple-ply veneer it is proposed that the a sealing layer be applied to the surface of the veneer first produced in known fashion prior to further processing into veneered parts. The veneers produced in known fashion are present as sheets or rolls. By means of applying a sealing layer to these large-area veneers the veneer is completely finished in its surface, which corresponds to the later face, before the veneer is glued, covered, laminated, or the like. As a result only one area coating or finishing of the veneer surface is necessary, which represents a significant simplification. One obtains thus a large-area "finished veneer", which in subsequent processing into veneered parts, which can take place either after an intermediate storage on a veneer roll or immediately following, is only bonded with the wooden or derived timber product support, without an expensive surface finishing of the veneered parts through profile geometries being necessary.

In an advantageous development of the invention's production method for veneer the sealing layer is applied as a water-free and solvent-free atmospheric moisture curing cold-hardening hot-melt sealing layer on polyurethane basis. The water- and solvent-free cold-hardening hot-melt sealing layer is applied to the surface to be sealed at a temperature of above 100° C., about 100° C. to 140° C. In the process about 50 to 100 g of cold-hardening hot-melt sealing is applied per square meter to the surface to be coated. The cold-hardening hot-melt sealing usually has a density of approximately 1.1 g/m$^2$ and a viscosity according to Brookfield at 120° C. of about 4,000 mPas. However, significantly higher viscosities of the cold-hardening hot-melt sealing layer of up to 30,000 mPas are conceivable. It is favorable to apply the cold-hardening hot-melt sealing layer under the exclusion of air and shielding from atmospheric pressure, to prevent premature reactions. The layer can for example be scraped on, rolled on, sprayed on or applied by means of a nozzle or air jet. Even in cured state as a 100% solid the cold-hardening hot-melt sealing layer still exhibits a certain residual elasticity. A cold-hardening hot-melt sealing layer has proved to be advantageous for the coating of veneer, because it can be applied in a single coating to the surface of the veneer. The remaining residual elasticity of the sealing layer makes possible the subsequent gluing processes, even around profile geometries. In the process the sealing layer effects an additional stabilization of the veneer surface, which prevents cracks in the surface. As a result is also possible, depending on the subsequent use of the veneer (surface lamination, edge gluing, profile wrapping) to dispense with the fiber mat usually glued to the rear side of the veneer prior to further processing of the parts to be veneered, i.e. along with the material costs for fiber mat and adhesive for gluing the fiber mat the processor saves a complete processing step. Above all with simple profile geometries and surface laminations it is advantageously possible to dispense with fiber mat. In addition to these advantages, the cold-hardening hot-melt sealing layer exhibits a high UV stability, a high degree of hardness, resistance to scratches and a very high resistance to shock. The processing of the cold-hardening hot-melt sealing layer requires only slight machine investments and little space in comparison to conventional painting plants. Coating with cold-hardening hot-melt sealing represents a simple hot-cold reaction with subsequent cross-linking process with the help of moisture from the air or the material, without an ultraviolet or electron ray curing or the like being necessary.

An improvement of the surface properties of the cold-hardening hot-melt sealing layer can be achieved by polishing the cold-hardening hot-melt sealing layer after application to the surface of the veneer. As a result of this, unevenness of the surface is avoided, which can come into being merely by means of the application of the hot cold-hardening hot-melt sealing, and the result is an even smoother surface. It is also possible then to work with smaller material quantities between 50 and 100 g/m$^2$ on the cold-hardening hot-melt sealing.

It is advantageous to add heat once more to the surface of the cold-hardening hot-melt sealing layer between the application and the polishing, in order to further improve the results of the polishing. Favorably the polishing takes place by means of a roller, for example a steel roller, which if necessary can be provided with a polyurethane coating.

It is particularly advantageous if the roller is sprinkled with a stripping agent during the polishing process. In this way one effectively prevents the still not cured cold-hardening hot-melt sealing layer from separating on the part to be sealed and sticking to the roller. Preferably the stripping agent is applied as a solvent-free and low-viscosity agent on a paraffin wax basis. Such an agent on the one hand prevents the sticking of the cold-hardening hot-melt sealing layer to the roller and in addition the surface of the cold-hardening hot-melt sealing layer becomes significantly smoother and immediately block-free. The stripping agent on paraffin wax basis is clear and has for example a density of approximately 0.85 g/cm$^3$ as well as a viscosity at 20° C. according to Brookfield of about 34 mPas. A viscosity range between 30 and 500 mPas is conceivable. The application quantity amounts to about 20 to 35 g/m$^2$.

The stripping agent is for example applied to the roller in a spray process or vacuum spray process. However, it is preferred to apply the stripping agent to the roller by means of soaked felt, which represents an especially easy and secure option for creating a uniform, thin film of stripping agent during the polishing of the cold-hardening hot-melt sealing layer.

A device for producing veneer with a sealing layer on its surface contains a veneer producing device known per se, a finishing station, a transporting device and a polishing station. In the process it is favorable if there is a heating device arranged between the finishing station and the polishing station.

In a preferred embodiment of the device the polishing station contains at least one roller, which preferably is a steel roller and depending on the application situation exhibits a polyurethane coating. In addition it is advantageous if the roller can be sprinkled with a stripping agent. This stripping agent is for example an above described agent on paraffin wax basis. A spray device, vacuum spray device or a soaked piece of felt can for example be used to sprinkle the roller with the stripping agent.

In a method for producing a veneered part a single-ply or multiple-ply veneer as per the invention is glued to a wooden or derived timber product support. As already explained, as a result of this it is possible, depending on the application situation, to forego the gluing of a fiber mat to the rear of the veneer prior to further processing, without fearing that cracks will develop in the veneer surface during coating of profile geometries. Additionally, it is no longer necessary to finish the surface of the veneered part by means of sanding and painting.

BRIEF DESCRIPTION OF THE DRAWINGS

In the drawing the invention is explained using an exemplified embodiment. The figures show the following:

FIG. 2 shows a device for producing veneer with a sealing layer on the surface, FIG. 4 shows a different device for coating veneer rolls.

DETAILED DESCRIPTION

Figure 1:
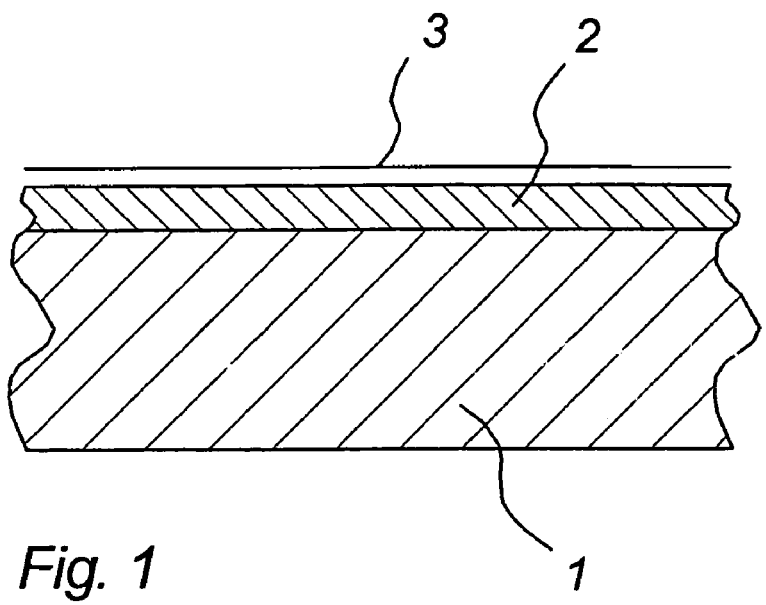
FIG. 1 shows a schematic section of veneer as per the invention with a sealing layer on the surface.

FIG. 1 shows a section of veneer 1 having a top side that is permanently exposed in use, such as, for example, the surface of an item of furniture. On the top exposed side of the veneer 1 a sealing layer 2 is applied made of a water-free and solvent-free cold-hardening hot-melt sealing layer curing with the atmospheric pressure on polyurethane, which has been polished during production after application by means of a roller sprinkled with stripping agent. This polishing operation results in a particularly smooth surface of the sealing layer which is indicated by means of the continuous line 3.

FIG. 2 shows a diagramatically represented production line 4 for continuous production of the invention's veneer 1. The production line 4 contains a veneer producing device that is known per se and is not shown, in which the veneer for example is produced by means of stripping from a solid piece of wood. However, it would also be possible to add conventional veneers without surface coating, which are for example rolled up in a veneer roll, to the production line for a surface coating. A transporting device 5 for the veneer to be coated transports the veneer 1 first from the veneer producing device to a finishing station 6. At the finishing station 6 the cold-hardening hot-melt sealing layer is heated to at least 100° C. under the exclusion of air and shielding from atmospheric pressure and then pumped by a pump device not shown in the figure into a heated hose, conducted through the hose to a finishing station, for example an air jet 7 and applied to the veneer 1 by the air jet.

The cold-hardening hot-melt sealing layer is a water-free and solvent-free cold-hardening hot-melt sealing layer on polyurethane basis curing with the atmospheric pressure, which is applied to the surface to be sealed at a temperature above 100° C., for example 100° C. to 140° C. In the process about 50 to 100 g of cold-hardening hot-melt sealing is applied per square meter of surface to be coated. The cold-hardening hot-melt sealing normally has a density of about 1.1 g/m$^2$ and a viscosity according to Brookfield at 120° C. of about 4,000 mPas, whereby a higher viscosity of up to 30,000 mPas is also conceivable. It is favorable to apply the cold-hardening hot-melt sealing layer under the exclusion of air and shielding from atmospheric pressure to avoid a premature reaction. The layer can for example be scraped on, rolled on, sprayed on or applied by means of a nozzle or air jet.

The veneer 1 coated with the cold-hardening hot-melt sealing layer is further transported from the finishing station to fixing and polishing station 8. Between the application of the cold-hardening hot-melt sealing layer 2 and the fixing station 8 the surface of the cold-hardening hot-melt sealing layer is furnished with heat via an indicated heating device 9, in order to keep the cold-hardening hot-melt sealing layer at least viscous.

At the fixing and polishing station 8 there are 3 pivoted rollers 10 that can be adjusted in height if necessary. The rollers are provided with a polyurethane coating. Above each of the rollers 10 is a piece felt 11 that the rollers are in contact with, said felt being soaked with a stripping agent on paraffin wax basis. By means of turning the rollers the felt applies a uniformly low quantity of the stripping agent as a thin layer to the surface of the rollers 10, which these pass along upon contact with the surface of the cold-hardening hot-melt sealing layer 2. By means of the stripping agent the surface of the cold-hardening hot-melt sealing layer 2 is immediately block-free and supports the polishing operation.

The coated and polished veneers are further transported by the transporting device 6 from the fixing and polishing station 8 and normally placed in temporary storage for about three to four days for cross-linking of the cold-hardening hot-melt sealing layer 2. After complete cross-linking the cold-hardening hot-melt sealing layer 2 forms a sealing layer solidly bound with the veneer 1 on the surface, which represents a 100% solid body and whose thickness during the application can be set to between 5 and 150 my depending on requirements. A further processing of the veneer 1 is then possible for production of veneered parts.

Figure 3:
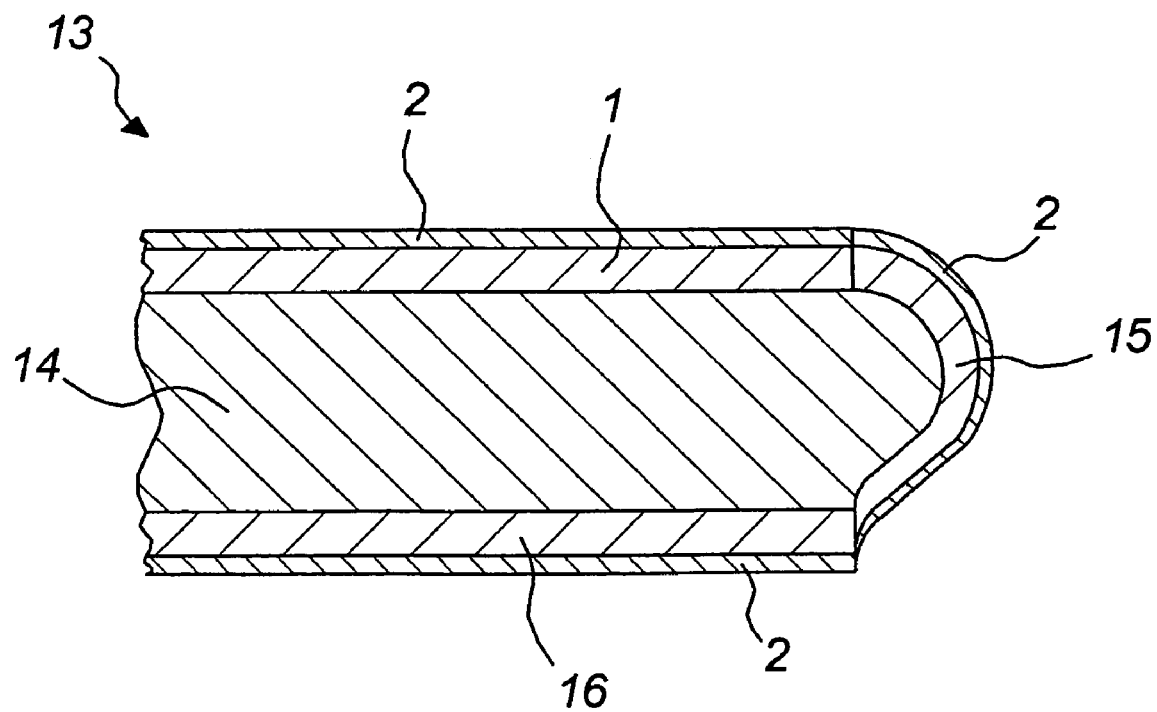
FIG. 3 shows an enlarged section of a veneered part as opposed to the section in FIG. 1.

FIG. 3 shows a veneered part 13. Veneers 1, 15, 16 are glued to a wooden or timber product derivative support 14. On the surface of the veneers 1, 15, 16 a sealing layer 2 is applied on the face as a water-free and solvent-free atmospheric moisture cross-linking cold-hardening hot-melt sealing layer on polyurethane basis, as has been explained in greater detail in FIG. 1. The veneer 15 has, for example, glued on by means of a soft-forming method on a edge gluing machine not shown in the figure. The residual elasticity contained in the reacted cold-hardening hot-melt sealing layer holds the surface of the veneer 1 together, so that cracks or gaps are avoided in veneer 1. For this reason a fiber mat glued to the rear of the veneer 1 can be dispensed with.

Basically the veneer 1 furnished with a sealing layer 2 can be glued in any way. It is possible to take the veneer 1 provided with a sealing layer 2 after first coating of the surface of the veneer 1 on a separate piece of equipment and then roll it up again into a veneer roll and further process it at a later time. In addition, a further processing immediately after the coating is conceivable for example in a pass on a wrapping machine, an edge gluing machine, a post-forming machine or a surface laminating machine.

A device 17 for coating veneer rolls is diagramatically represented in FIG. 4. The uncoated veneer 1 is removed by a delivery spool 18 and fed to an application unit 19, in which via rollers 20 a water-free and solvent free atmospheric moisture curing cold-hardening hot-melt sealing layer on polyurethane basis is applied. Passing through a heating source 21, the veneer is fed to the fixing and polishing station arranged in a housing 22.

Located in the housing are pressure and polishing roller pairs 23, 24, 25, by means of which the applied cold-hardening hot-melt sealing layer on the veneer is pressed and polished. The roller pairs 23, 24, between which an additional heating source 26 is arranged, are sprinkled during the pressing and polishing operation by means of a piece of felt 27 with a stripping agent on paraffin wax basis already described in greater detail above. By means of the already described effect of the stripping agent the cold-hardening hot-melt sealing layer applied on the veneer is immediately block-free, so that the rolled up veneer is prevented from adhering to itself. Additionally, a cooling zone 28 indicated by arrows is arranged between the roller pairs 24 and 25. After leaving the housing 22 of the fixing and polishing station the coated veneer is rolled back up into a veneer roll 30 by means of a guide roller 29. The cold-hardening hot-melt sealing layer of the rolled up veneer then has the opportunity to completely cross-link chemically.

It is possible to use the described device to coat uncoated veneer rolls in an automatic and continuous process and roll them up.

The invention claimed is:

1. A method for sealing single- or multi-ply veneer, comprising applying directly to an outer surface of the veneer a sealing layer as a water- and solvent-free atmospheric moisture curing reactive hot-melt layer based on polyurethane.

2. The method according to claim 1, including smoothing the reactive hot-melt layer after the hot melt layer is applied to the surface.

3. The method according to claim 2, wherein the smoothing of the reactive hot-melt layer is effected by at least one roll.

4. The method according to claim 2, including supplying heat to the surface of the reactive hot-melt layer between the applying and smoothing steps.

5. The method according to claim 4, wherein the smoothing of the reactive hot-melt layer is effected by at least one roll.

6. The method according to claim 5, wherein a steel roll is used for the smoothing.

7. The method according to claim 3, wherein a steel roll is used for the smoothing.

8. The method according to claim 5, wherein the roll has a polyurethane coating.

9. The method according to claim 8, wherein the roll is wetted with a release agent during the smoothing.

10. The method according to claim 9, wherein the release agent is applied as a solvent-free and low-viscosity agent based on paraffin wax.

11. The method according to claim 10, wherein the release agent is applied to the roll by spraying.

12. The method according to claim 9, wherein the release agent is applied to the roll by spraying.

13. The method according to claim 9, wherein the release agent is applied to the roll by vacuum spraying.

14. The method according to claim 10, wherein the release agent is applied to the roll by vacuum spraying.

15. The method according to claim 9, wherein the release agent is applied by a saturated felt.

16. The method according to claim 10, wherein the release agent is applied by a saturated felt.

17. A single- or multi-ply veneer having a sealed outer surface, comprising:
an outer surface;
a sealing layer applied directly to the surface;
the sealing layer being configured as a water- and solvent-free atmospheric moisture curing reactive hot-melt layer based on polyurethane, the sealing layer, even in the cured state, still retaining a certain elasticity.

18. The veneer according to claim 17, wherein the reactive hot-melt layer applied to the surface is smooth.

19. A method for the forming of veneered parts, comprising:
producing single- or multi-ply veneer having a sealed outer surface according to the method of claim 1, and
further processing of the veneer by attaching the veneer to a support for the forming of the veneered part.

20. A veneered part comprising a support to which a veneer according to claim 17 is attached.

21. The veneered part of claim 20, wherein the support is a wood or wood based support.

22. The method of claim 20, wherein the support is a wood or wood based support.

* * * * *